United States Patent [19]

Parker

[11] Patent Number: 4,758,542
[45] Date of Patent: Jul. 19, 1988

[54] LOW THERMAL EXPANSION ZRTIO$_4$—AL$_2$TIO$_5$—ZRO$_2$ COMPOSITIONS

[75] Inventor: Frederick J. Parker, Columbia, Md.
[73] Assignee: W. R. Grace & Co., New York, N.Y.
[21] Appl. No.: 82,698
[22] Filed: Aug. 7, 1987

Related U.S. Application Data

[63] Continuation-in-part of Ser. No. 14,560, Feb. 13, 1987.
[51] Int. Cl.$^4$ .................... C04B 35/46; C04B 35/48; C04B 35/49
[52] U.S. Cl. .................................. 501/134; 501/105; 501/127; 501/153
[58] Field of Search ....... 501/134, 10, 105, 134 ATD, 501/127, 153

[56] References Cited

U.S. PATENT DOCUMENTS

| | | | |
|---|---|---|---|
| 2,776,896 | 1/1957 | Harman et al. | 106/39 |
| 4,126,477 | 11/1978 | Reade | 106/39.7 |
| 4,307,198 | 12/1981 | Oda et al. | 501/119 |
| 4,316,964 | 2/1982 | Lange | 501/105 |
| 4,327,188 | 4/1982 | Endo et al. | 501/134 |
| 4,483,944 | 11/1984 | Day et al. | 502/439 |

FOREIGN PATENT DOCUMENTS

| | | |
|---|---|---|
| 898604 | 5/1984 | Belgium . |
| 1915787 | 9/1968 | Fed. Rep. of Germany . |
| 52-23113 | 2/1977 | Japan . |
| 55-62840 | 5/1980 | Japan . |
| 55-62841 | 5/1980 | Japan . |
| 55-62842 | 5/1980 | Japan . |
| 55-62843 | 5/1980 | Japan . |
| 55-63387 | 5/1980 | Japan . |
| 55-121967 | 9/1980 | Japan . |
| 55-121966 | 9/1980 | Japan . |
| 60-46970 | 3/1985 | Japan . |
| 899600 | 1/1982 | U.S.S.R. . |

OTHER PUBLICATIONS

Chemical Abstracts, vol. 103, No. 14, p. 264, Abstract No. 108975, Silich, L. M. et al., "Effects of Zirconia on the Formation of Aluminum Titanate".
L. Silich et al., Steklo i Silikaty, vol. 13, pp. 110–114 (1984).
A. McHale et al., J. Am. Ceram. Soc., vol. 69(11), pp. 827–832 (1986).

Primary Examiner—William R. Dixon, Jr.
Assistant Examiner—Andrew B. Griffis
Attorney, Agent, or Firm—Edward J. Cabic

[57] ABSTRACT

A low thermal expansion ceramic composition having a predominant Al$_2$TiO$_5$ phase along with zirconium titanate and zirconia phases. The final overall ceramic composition after firing has a low thermal expansion between 24°–1000° C. of not greater than $1.5 \times 10^{-6}$° C.$^{-1}$ and a thermal stability in air such that (a) upon heating to 1200° C. for at least 4 hours there is substantially no decomposition of the Al$_2$TiO$_5$ phase to rutile or alumina as measured by X-ray diffraction, (b) physical growth after thermal cycling between 200° and 1150° C. for 300 cycles does not exceed 1.5%, and (c) the composition maintains a low average thermal expansion between 24°–1000° C. of not greater than $1.5 \times 10^{-6}$° C.$^{-1}$ after the isothermal heating or cycling conditions. The composition is preferably made by forming a mixture of the equivalent of 50–90 volume percent Al$_2$TiO$_5$ or a solid solution having a substantial amount of Al$_2$TiO$_5$ in the solid solution, and zirconium titanate and then heating the mixture at a temperature of 1250° C. or higher.

27 Claims, 2 Drawing Sheets

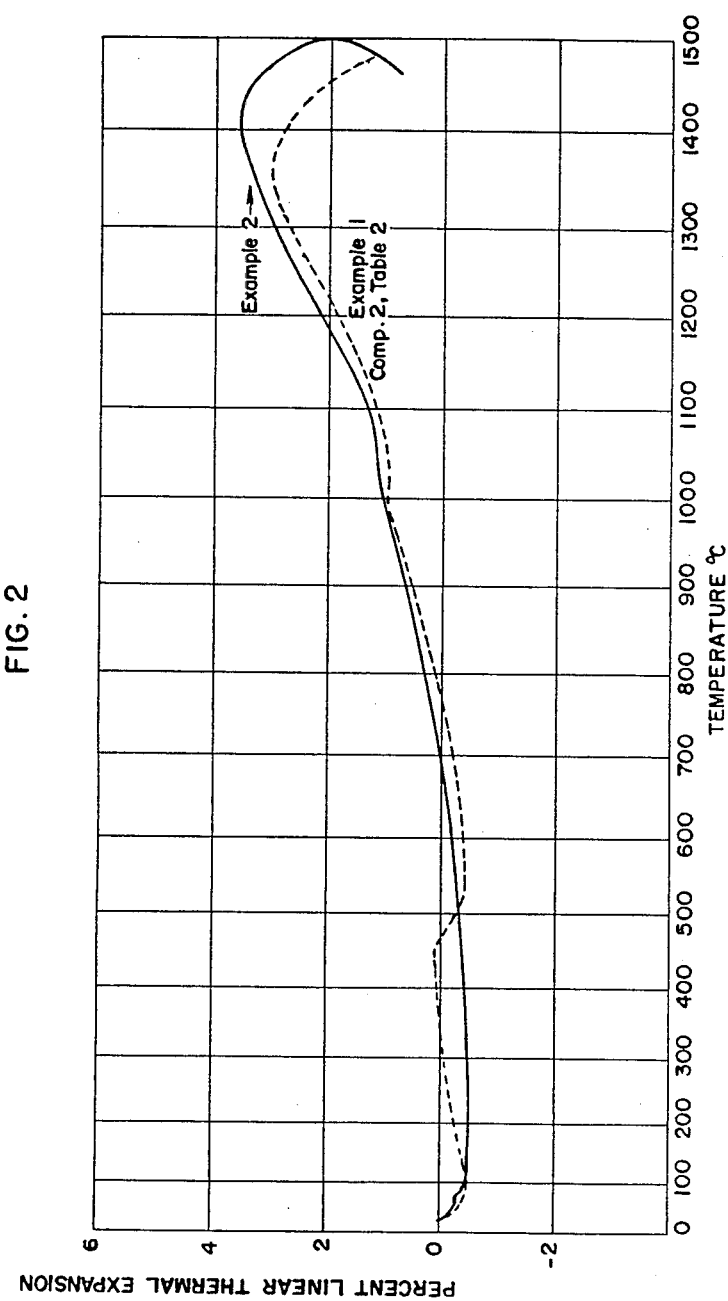

LOW THERMAL EXPANSION ZRTIO$_4$—AL$_2$TIO$_5$—ZRO$_2$ COMPOSITIONS

This application is a continuation-in-part of U.S. application Ser. No. 014,560, filed Feb. 13, 1987.

BACKGROUND OF THE INVENTION

1. Field of the Invention

This invention relates to low thermal expansion ceramic composite compositions based upon zirconium titanate and Al$_2$TiO$_5$, and their solid solutions, which have high melting points and excellent phase stability at high temperatures or cycling conditions.

2. Description of Previously Published Art

Materials with excellent thermal shock resistance are required for a wide range of service applications including automotive catalyst supports, molten metal filters, welding fixtures, kilnware, etc. For high temperatures above 1000° C., this necessitates the use of ceramic materials. It is known that the thermal shock resistance depends upon the characteristics of the material, including strength, Young's Modulus, coefficient of thermal expansion, thermal conductivity, and the physical configurations of the shape. The coefficient of thermal expansion is especially critical since low values mean the material undergoes minimal dimensional changes over a wide temperature range.

Consequently, the use of low expansion materials in applications which see rapid, gross temperature changes, usually designated delta T by those skilled in the art, is highly desirable. These materials are not prone to the large stress buildups and consequent fracturing with extreme thermal cycling or large delta T values.

A wide variety of crystalline ceramics have been utilized for their low thermal expansions/high melting points for such applications. Crystalline materials may have isotropic or anisotropic thermal expansions; that is, expansions may be the same, similar, or very different for each of the crystallographic directions. Lithium aluminum silicate (Beta-spodumene) shows marked anisotropy such that its thermal expansion alpha$_{24°-1000°C.}$ along its c-axis is $-17.6 \times 10^{-6}°C.^{-1}$ while the two values normal to the c-axis are each $+8.2 \times 10^{-6}°C.^{-1}$. Its melting point limits the service use to about 1200° C. Cordierite, Mg$_2$Al$_4$Si$_5$O$_{18}$, is widely used to temperatures of about 1450° C. Cordierite has crystallographic expansions of $-1.1 \times 10^{-6}°C.^{-1}$ along its c-axis and $+2.90 \times 10^{-6}°C.^{-1}$ normal to the c-axis. However, the average expansions of a polycrystalline cordierite ceramics range between 0.7 and $1.5 \times 10^{-6}°C.^{-1}$.

Aluminum titanate, Al$_2$TiO$_5$, has expansion values of $-3.0$, $+11.8$ and $+21.8 \times 10^{-6}°C.^{-1}$ for its three crystallographic directions. Aluminum titanate mixed with mullite to form a mullite-Al$_2$TiO$_5$ (MAT) particle composite has experienced much research for thermal shock use. Its polycrystalline expansion ranges between approximately 0.5 and $1.5 \times 10^{-6}°C.^{-1}$. The resultant material properties reflect a compromise of the low strength/low expansion of Al$_2$TiO$_5$ and high strength/moderate expansion of mullite. These materials are highly complex due to the propensity of the Al$_2$TiO$_5$ to severely microcrack, and the decomposition of Al$_2$TiO$_5$ to Al$_2$O$_3$ and TiO$_2$ between 800°–1250° C., above which they recombine to again form Al$_2$TiO$_5$. Much work has been done to control the decomposition of Al$_2$TiO$_5$ by the addition of small amounts of stabilizers, including MgO and Fe$_2$O$_3$, into solid solution. This is recognized in the prior art, notably U.S. Pat. No. 2,776,896.

Other references note some beneficial results from the addition of rare earths, SiO$_2$, CaO, BaO, etc. to Al$_2$TiO$_5$ but these have received less attention. However, the complex interrelationships between microcracking, phase stability and physical/mechanical properties make Al$_2$TiO$_5$ or mullite-Al$_2$TiO$_5$ a very difficult material to control.

Zirconia has received much attention in the ceramics industry and there are many commercial ZrO$_2$ products and processes. The ability of ZrO$_2$ to be stabilized with additives such as Y$_2$O$_3$, CaO or MgO to maintain a metastable high temperature phase has been recognized. By adding unstabilized or partially stabilized ZrO$_2$ to a constraining matrix of a second ceramic such as Al$_2$O$_3$ or mullite, the ZrO$_2$ imparts a greater toughness to the resultant ceramic composite, thereby enhancing its mechanical properties. The affect of the ZrO$_2$ added is strongly dependent upon the amount of ZrO$_2$, as well as the particle size (generally on the order of 0.5 microns), which are essential to achieve effective toughening. See U.S. Pat. No. 4,316,964.

Al$_2$TiO$_5$ has been combined with various materials. For example, Japanese Patent Publications Nos. 55062840, 55062841, 55062842 and 55062843 disclose adding zircon (ZrSiO$_4$) and alkaline earth metal oxides or hydroxides. Japanese Patent Publication No. 55063387 discloses zirconium (Zr) and alkaline earth metal oxide. German Pat. No. 19 15 787 discloses adding zirconium silicate. Japanese Patent Publication No. 52023113 discloses zirconia or silica. Other references disclosing zirconia are L. M. Silich et al in Steklo, Sitally i Silikaty, vol. 13, pages 110–14 (1984), Soviet Pat. No. 899600 and Japanese Patent Publication No. 55121967. Japanese Patent Publication No. 79025045 discloses adding to aluminum titanate, zirconia and Y$_2$O$_3$, CeO$_2$ and/or La$_2$O$_3$. Japanese Patent Publication No. 60046970 discloses adding 1–10 wt % of at least one of Fe$_2$O$_3$, SiO$_2$, MgO, ZrO$_2$, cordierite, mullite and clay to a composition of 100 parts by weight of aluminum titanate, 0.5–10 parts by weight of Li$_2$O and 4.5–30 parts by weight of SiO$_2$. Belgian Patent No. 898,604 discloses zircon and alumina which can have further added titanium oxide.

ZrTiO$_4$ and its solid solutions (especially with SnO$_2$) have been extensively utilized in the electronics industry due to their good dielectric properties in microwave regimes. ZrTiO$_4$ has also been used as a base for multiphase pigments for high temperature applications. However, there is little evidence in the literature indicating that ZrTiO$_4$ has been considered for technical ceramics applications such as those proposed herein. A recent study by McHale and Roth (1986) describes the complex series of continuous phase transformations which zirconium titanate undergoes below approximately 1150° C. It was found that when the stoichiometry 1 ZrO$_2$:1 TiO$_2$ is reacted, ZrTiO$_4$ does not form as previously believed. Instead, some ZrO$_2$ is precipitated out and a continuous series of possible zirconium titanate compositions may form. The propensity of zirconium titanate to form solid solutions, and the important role of minor impurities on the behavior of zirconium titanate compositions is noted.

The interrelationship between the microstructure of a ceramic and the compositional effects of the constituents is known in the literature. By microstructure, the grain sizes, grain orientations, porosity, distributions of phases and other physical characteristics of the ceramic are taken into account. Mullite-Aluminum Titanate composites are used by way of illustration. It is known that Aluminum Titanate experiences microcracking due to its high degree of crystal anisotropy which, in turn, leads to a macroscopic low thermal expansion. However, the size of the microcracks is directly related to the size of the aluminum titanate grains in the microstructure. Hence, thermal expansion reflects the size of available microcracks which, in turn, is dependent upon grain size. Too small a grain size does not allow effective microcracking and there will be no effective reduction the thermal expansion. Conversely, too large of a grain size may create very large microcracks which gives a low thermal expansion but can also lead to a significant reduction of the mechanical integrity of the ceramic. Thus, a mullite-aluminum titanate ceramic with a 15 micron aluminum titanate average grain size gives $alpha_{24°-1000°\ C.} = 1.5 \times 10^{-6}°C.^{-1}$, while an identical composition with a finer, 1-2 micron aluminum titanate average grain size gives $alpha_{24°-1000°\ C.} = 4.5 \times 10^{-6}°C.^{-1}$, and an intermediate grain size of 10 microns gives $alpha_{24°-1000°\ C.} = 2.8 \times 10^{-6}°C.^{-1}$. This effect may be further altered by the addition of small amounts of phase stabilizers to aluminum titanate. Since the stabilizers reduce crystal anisotropy to inhibit decomposition, it follows that such solid solutions may also change microcrack size and consequently, thermal expansion. Therefore, by manipulating grain size versus composition of the aluminum titanate, a balance can be achieved between chemical composition of the constituents and microstructural relationships to create changes in properties, for example, thermal expansion.

OBJECTS OF THE INVENTION

It is an object of this invention to produce a low expansion ceramic composition utilizing zirconium titanate as a constituent for high temperature applications requiring thermal shock resistance.

It is an object of this invention to produce a low thermal expansion ceramic composition with a high melting point of 1500° C. or higher and phase stability at high temperatures.

It is an object of this invention to prepare low expansion ceramics composed essentially of $Al_2O_3$, $TiO_2$, and $ZrO_2$ wherein the crystalline phases of the fired product consist primarily of $Al_2TiO_5$, zirconium titanate and zirconia, or solid solutions thereof with appropriate resultant microstructures. Such ceramic compositions have average thermal expansions coefficients of not more than $1.5 \times 10^{-6}°C.^{-1}$ in the temperature range of 25°-1000° C., and maintain their low coefficient of thermal expansion and phase stability after thermal cycling in air between 200°-1150° C. for 300 cycles.

It is a further object of this invention to provide methods of producing low expansion ceramics by mixing sources of $Al_2O_3$, $TiO_2$, $ZrO_2$ and stabilizers chosen from $SiO_2$ and/or $Fe_2O_3$ where at least one of the final phases is preferably pre-reacted; shaping the batch; drying the shaped batch if necessary; and firing the batch at a temperature of 1250° C. or higher.

A further object of this invention is to prepare a batch as above, adding water or plasticizer; preparing a shape such as a monolithic honeycomb by extrusion; drying the shape; and firing the batch at a temperature of 1250° C. or higher.

It is a further object of this invention to provide methods of producing low expansion ceramics by mixing pre-reacted powders of $Al_2TiO_5$ and zirconium titanate, or solid solutions thereof along with appropriate additives; shaping the batch; drying the batch if necessary; and firing the batch at a temperature of 1250° C. or higher.

These and further objects will become apparent as the description of the invention proceeds.

SUMMARY OF THE INVENTION

The invention described herein utilizes the properties of three oxide phase components to create a composite material with a low overall thermal expansion. Properties can be enhanced by manipulating the crystal chemistry of the components by creating limited solid solutions. The fired ceramic composite composition comprises, according to X-ray diffraction, a predominant $Al_2TiO_5$ phase along with zirconium titanate and zirconia phases where the final overall ceramic composition has a low thermal expansion between 24°-1000° C. of not greater than $1.5 \times 10^{-6}°C.^{-1}$ and a thermal stability in air such that (a) upon heating to 1200° C. for at least 4 hours there is substantially no decomposition of the $Al_2TiO_5$ phase to rutile or alumina as measured by X-ray diffraction, (b) physical growth after thermal cycling between 200° and 1150° C. for 300 cycles does not exceed 1.5%, and (c) the composition maintains a low average thermal expansion between 24°-1000° C. of not greater than $1.5 \times 10^{-6}°C.^{-1}$ after the isothermal heating or cycling conditions. These phases can also contain small amounts of compatible oxides in solid solutions created during the calcining or sintering process. The resultant ceramics contain the zirconium titanate and zirconia phases well dispersed with the predominant aluminum titanate phase. The resultant ceramic has low coefficient of thermal expansion to at least 1000° C., and all phases maintain high temperature phase stabilities. The average thermal expansion values of each pure component are shown in Table 1. Although the additive expansion values of the individual components are quite high, measured values of composite compositions show the expansion values to be low, even sometimes negative. This is attributed to the microcracking and phase behavior of the three compositions which, when combined, lead to the high temperature/low expansion properties as described herein.

The ceramic composition can be made by firing at a temperature of 1250° C. or higher a starting mixture in the proper proportions of a source of $ZrO_2$, a source of $TiO_2$, and a source of $Al_2O_3$. In the more preferred embodiment the starting mixture prior to firing comprises at least the stoichiometric equivalent of 50-90 volume percent $Al_2TiO_5$ or a solid solution having a substantial amount of $Al_2TiO_5$ in the solid solution, and 10-50 volume percent zirconium titanate. By this we mean that the starting mixture can either be (i) prereacted $Al_2TiO_5$ and prereacted zirconium titanate, (ii) prereacted $Al_2TiO_5$ and sources of $TiO_2$ and $ZrO_2$ to form zirconium titanate, or (iii) prereacted zirconium titanate and sources of $Al_2O_3$ and $TiO_2$ to form $Al_2TiO_5$.

The stoichiometry of the starting zirconium titanate or its oxide components should preferably be approximately 1 $ZrO_2$:1 $TiO_2$. During sintering, some excess $ZrO_2$ is precipitated out as a separate phase, creating one of a series of complex zirconium titanates. The final composite contains three complex compositions in an intimate microstructure which gives the claimed low expansion/high temperature properties.

BRIEF DESCRIPTION OF THE DRAWINGS

FIG. 2 is a dilatometer curve for another composition according to the present invention.

DESCRIPTION OF THE SPECIFIC EMBODIMENTS

Figure 1:
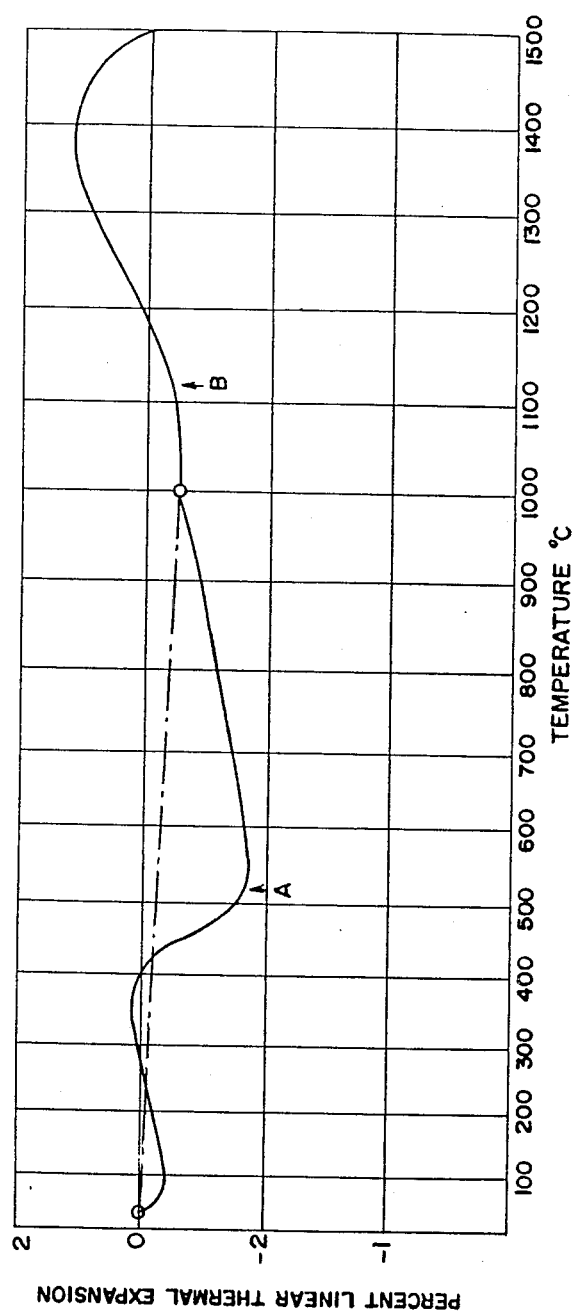
FIG. 1 is a dilatometer curve for a composition according to the present invention.

Ceramic compositions have been developed which have low thermal expansions and high temperature phase stability. These fired ceramics are composites consisting of three phases of controlled composition based upon processing. Aluminum titanate, or solid solutions thereof, is the primary phase along with zirconium titanate and zirconia, or solid solutions thereof. A phase is defined as a component which is physically homogeneous within itself, but distinct from other components. In this case, $Al_2TiO_5$, $ZrTiO_4$ and $ZrO_2$ would each be one phase even if they contained small amounts of compatible elements in solid solution. It is further recognized that $ZrO_2$ can exist in three polymorphic forms: tetragonal, monoclinic and cubic. These are distinguished by X-ray diffraction, although the similarity of cubic and tetragonal forms makes unambiguous identification difficult. Recent techniques involving Raman spectroscopy reduces the ambiguity, but such techniques are not widely available in the industry. The high temperature tetragonal and cubic forms of $ZrO_2$ can be stabilized by adding small amounts of CaO, $Y_2O_3$ or MgO. Such additions retain the tetragonal or cubic structures below their normal transformation temperature, and this is known in the art as a way of producing toughened ceramics. Although the monoclinic form is preferred, the presence of, or addition of excess, cubic or tetragonal forms of $ZrO_2$ do not depart from the intent of this invention.

By solid solutions, it is meant that small amounts of other elements may be dissolved in, and structurally become a part of, a given phase. For example, $Fe_2O_3$ may go into $Al_2TiO_5$, or $TiO_2$ into $ZrO_2$, to form solid solutions during calcining or sintering.

In order for solid solution to occur, the solute element must have approximately the same ionic radius and similar ($\pm 1$ valence) atomic charge as the element which it is replacing. Similarity of crystal structures is also helpful but not always necessary. For example, $Fe^{+3}$, with a radius of 0.64 Angstroms, readily goes into solid solution in $Al_2TiO_5$ for $Al^{+3}$, which has a radius of 0.50 Angstroms. Therefore, other elements such as $Cr^{+3}$ (radius = 0.69 Angstroms) and $Mg^{+2}$ (radius = 0.65 Angstroms) can also be expected to form compatable solutions with $Al^{+3}$. A similar case could be made for $Si^{+4}$, $Zr^{+4}$, etc., substituting for $Ti^{+4}$. It is postulated that small amounts of foreign elements may diffuse between phases during sintering/calcining, resulting in more complex solid solutions than intended. The overall charge balance must be maintained, regardless of substitutions. The product remains a single phase and the overall crystallographic structure of the host phase is maintained although some properties such as melting point, thermal expansion, phase stability, etc, may be changed.

The aluminum titanate-zirconium titanate-zirconia composite also has a high melting point (greater than 1600° C.) and excellent phase stability at high temperatures and under cycling conditions. Stability has been demonstrated in oxidizing atmospheres at temperatures of at least 1000° C. Such properties make the described materials very useful for high temperature, thermal shock applications. A specific application is monolithic catalyst supports.

The combination of aluminum titanate-zirconium titanate-zirconia, or their solid solutions, to form a composite ceramic with low expansion and phase stability was unexpected. All of the materials have individual thermal expansions higher than when the three are combined. Furthermore, the difficulty of preventing the decomposition of $Al_2TiO_5$ into $Al_2O_3$ and $TiO_2$ between approx. 800°–1260° C. is well-known. Efforts to prevent decomposition by deliberately adding stabilizers, especially MgO, $Fe_2O_3$ and rare earths, are well documented in the literature. The unexpected low expansion and excellent high temperature properties of the composites containing aluminum titanate, zirconium titanate and zirconia are the result of the synergism between the components based upon their crystal chemical properties and subsequent microstructures and this is the essence of the novelty of the invention.

The compositions according to the present invention have been analyzed for thermal expansion at temperatures from 24° C. to 1500° C. by using an Orton Recording Dilatometer. Most compositions give a dilatometer trace with a dip beginning between 400°–900° C. shown as Feature A, FIG. 1, the magnitude of which depends upon composition. There is also an upward inflection in the slope (Feature B, FIG. 1) at greater than 1100° C. Compositions containing only trace amounts of zirconia by X-ray diffraction or compositions containing certain amounts or types of additions do not show a noticeable dip between 400°–900° C.

The calculated average values of the thermal expansion over this temperature range, $alpha_{24°-1000°\ C.}$, were $-1$ to $+1.5 \times 10^{-6}°C.^{-1}$, dependent upon the amount and compositions of the individual phases. Values were determined by drawing a line from the 24° C. to the 1000° C. points on the thermal expansion curve, and using the formula:

$$alpha_{24-1000°}\ C. = \frac{\text{delta } L}{L_o\ \text{delta } T},$$

where delta L = change in sample length over delta T delta T = temperature interval, (1000°−24°=976° C.)

$L_o$ = original length of sample.

This is illustrated in FIG. 1. Such low thermal expansion values were unexpected given the average thermal expansion values of the constituent phases which were shown by X-ray diffraction. Thermal expansion values of these compounds as reported in the literature are shown in Table 1. Since thermal expansions are additive relative to the amount of the component present, expansions on the order of $7.8–9.8 \times 10^{-6}°C.^1$ could be expected for the compositions claimed herein if no unique behavior was taking place.

TABLE 1

| Material | Average alpha $\times$ $10^{-6}$ °C.$^{-1}$ | Melting Points, °C. | Comments |
| --- | --- | --- | --- |
| $Al_2TiO_5$ (Aluminum titanate) | 10.2 | 1890 | Average of 3 crystallographic expansions |
| $Al_6Si_2O_{13}$ (Mullite) | 5.3 | 1880 | |

TABLE 1-continued

| Material | Average alpha × $10^{-6}$ °C.$^{-1}$ | Melting Points, °C. | Comments |
|---|---|---|---|
| ZrTiO$_4$ (Zirconium titanate) | 5.8 | 1760 | |
| ZrO$_2$ (monoclinic zirconia) | 8 | greater than 2500 | |

Processing is important to achieve the required phase compositions and microstructures needed to give low thermal expansions and high temperature stability. starting with at least one prereacted aluminum titanate or ziroconium titanate powder is a preferred method for achieving the proper balance of composition and microstructure. The zirconium tiatanate should be approximately 1 ZrO$_2$:1 TiO$_2$ such that during sintering, some ZrO$_2$ may precipitate out or otherwise be present as excess ZrO$_2$. The range of compositions expressed by ZrTi$_{1+x}$O$_{4+2x}$, where $0 \leq x < 1$, are the preferred range of starting stoichiometries. The addition of excess starting ZrO$_2$ can also give the desired phase assemblages and subsequent beneficial properties claimed. This ZrO$_2$ may contain TiO$_2$ in solid solution. The resultant zirconium titanate will be one of a series of complex stoichiometries similar to those observed by McHale and Roth (1986) in their recent study of ZrTiO$_4$.

The aluminum titanate-zirconium titanate-zirconia compositions claimed herein may be produced by a wide variety of processing techniques. The starting ratios of ZrTiO$_4$:Al$_2$TiO$_5$, or their solid solutions, should be controlled if the favorable high temperature properties are to be achieved. The starting mixture prior to firing should maintain the proper proportions of starting materials so as to comprise the equivalent of 50-90 vol % Al$_2$TiO$_5$ phase and the remainder 50-10 vol % zirconium titanate.

The preferred preparation route entails the prereaction of at least one of the titanates. That is, Al$_2$TiO$_5$ prepared by sintering 1:1 molar ratios of Al$_2$O$_3$ and TiO$_5$, and/or ZrTiO$_4$ prepared by sintering approximately 1:1 molar ratios of ZrO$_2$ and TiO$_2$ powders. In practice, a ZrO$_2$:TiO$_2$ stoichiometry where ZrO$_2$ is in excess of 1 ZrO$_2$:2 TiO$_2$ can create the excess ZrO$_2$ required to produce the desired three-phase ceramic composition claimed in this invention. The prereacted titanate powders, or one prereacted titanate and the appropriate amounts of oxides to form the second, can then be milled/mixed together, formed into a batch and fired at temperatures of 1250° C. or higher to form the ceramic.

Small quantities of additives, such as SiO$_2$ or Fe$_2$O$_3$, may be added as a component to aluminum titanate in any of the routes described above. Such additives maintain the properties of the Al$_2$TiO$_5$, and it is found that 1 to 5 mole % additions of, for example, SiO$_2$, Fe$_2$O$_3$ or mixtures thereof are advantageous. In addition, during calcining or sintering, there can be cation diffusion among components such that small amounts of ZrO$_2$ may go into solution in Al$_2$TiO$_5$, imparting beneficial properties.

Synthesis attempts have indicated that the benefit of low thermal expansions is only possible if the starting ZrO$_2$ powder particle size is large enough. This ZrO$_2$ powder can either be used to make the prereacted aluminum titanate or zirconium titanate or it can be added as a separate component. Thus, a fine unstabilized (monoclinic) ZrO$_2$, powder, with 0.1 micrometer particle size (ZIRCAR ZYP) gave a fired product whose thermal expansion was $1.3 \times 10^{-6}$°C.$^{-1}$, while an identical composition made using a 5.1 micrometer grain size ZrO$_2$ (TAM ZIROX 250) gave a thermal expansion of $-0.1 \times 10^{-6}$°C.$^{-1}$. This illustrates the necessity of optimizing microstructure as well as phase composition during processing to achieve the desired final ceramic.

It is further recognized that the compositions claimed herein may be produced by other chemical means if the proper starting stoichiometrics are maintained. Wet chemical methods may be utilized to prepare aluminum titanate-zirconium titanate-zirconia composite powders or their precursors by precipitation or sol gel chemistry. Co-precipitation or chemically coated particles also provide methods for preparing the required compositions, or their precursors which, upon calcining or sintering, will yield the required compositions and corresponding microstructures.

The preparation of powders for one or more component of the composite using melt-processing is recognized. The formation of a constituent phase or precursor phase from the liquid state can achieve a desired composition and/or an advantageous microstructure. The formation of materials with chemical homogeneity and well-developed microstructures is possible using materials derived from liquid melt processing techniques.

Microstructures which result from the firing of the compositions described herein contain predominant aluminum titanate along with dispersed zirconia and zirconium titanate. The aluminum titanate grains vary from irregularly rounded to elongate in shape. The majority of grain sizes range between 3-20 microns. Zirconium titanate grains range from irregular to rounded in shape, and the majority of grain sizes range between 2-10 microns. Zirconia grains range from irregular to rounded in shape, with the majority of grains ranging between 1-15 microns. Agglomerates of zirconia and/or zirconium titanate grains were observed. Throughout the aluminum titanate-zirconium titanate-zirconia composite microstructure are usually seen an abundance of dispersed microcracks of variable size. Dispersed porosity may or may not be present, depending upon the processing method.

The average particle sizes of starting powders used to describe these compositions ranged between 0.5-3.0 microns which is a reflection of available commercial materials. The prereacted aluminum titanates and zirconium titanates were milled to average particle sizes between 1.5-5 microns. However, additional variations in parameters such as particle sizes of starting materials, firing times and temperatures etc. which may influence the final microstructure with respect to absolute or relative grain sizes, distribution of phases, changes in porosity, alteration of microcracking, behavior, etc., are well known and apparent to those skilled in the art.

Although an explanation of the mechanism for low expansion and phase stability of the ceramics is not clearly understood, the following is suggested as a possible way to explain what is occurring. The solid solution of SiO$_2$, Fe$_2$O$_3$ and/or ZrO$_2$ into Al$_2$TiO$_5$ is believed responsible for its phase stability as well as controlled microcracking behavior due to the reduction in crystal anisotropy. It is acknowledged that rare earths, MgO, BaO, CaO, and other oxides discussed in the Description of the Prior Art section could also produce some beneficial effects. However, they appear to be less effective in the compositions described by this invention. Zirconium titanate, also thought to be a microcracker, is believed to exsolve, or "kick out", some $ZrO_2$ during sintering and the $ZrO_2$, in turn, contains some $TiO_2$ in solid solution. The presence of the $TiO_2$ in $ZrO_2$ causes the monoclinic to tetragonal phase transformation of $ZrO_2$ to occur at a lower temperature (e.g. 400°–900° C.) than that of pure $ZrO_2$ (about 1100° C.). The synergism of two microcracking phases plus a contractive phase transformation, is thought to create a population of cracks and voids into which the components may expand on a microscopic scale, thereby creating an overall low macroscopic thermal expansion.

This possible explanation is not to be considered as limiting the scope and spirit of the present invention as defined in the claims.

Having described the basic aspects of our invention, the following examples are given to illustrate specific embodiments thereof.

EXAMPLE 1

This example illustrates the preferred method of preparing the ceramic compositions described herein. A series of compositions whose constituents and firing conditions are shown in Table 2 were prepared. Samples were prepared by mixing the components of the $Al_2TiO_5$ as shown, milling in a Spex Mill for 30 minutes and pre-reacting the constituents at 1500°–1550° C. The resultant fired piece was then crushed and ground to a fine (2–5 micron) average particle size. The zirconium titanate powder (3 micron) was made in a batch by adding $ZrO_2$ and $TiO_2$ in 1:1 molar ratios, and preparing a pre-reacted powder in the same way described for $Al_2TiO_5$. Each $Al_2TiO_5$ powder was then mixed with the quantity of zirconium titanate powder noted in Table 2, milled 30–60 minutes in a Spex Mill, and the product pressed to a pellet. Pellets were sintered 2 hours at 1550° C.

Properties of the sintered pieces were determined.

Samples were then cycled using a microprocessor-controlled bottom-loading Teresco kiln. The kiln was programmed to do continuous cycling according to the following scheme. In one cycle there was a heat-up from 200° C. to 1000° C. which took 10 minutes. The composition was held at 1000° C. for 5 minutes after which it was rapidly air cooled to 200° C. where it was held for 13 minutes. Then the cycle repeated.

Samples were evaluated before and after 300 cycles to determine whether any significant property and phase changes occurred. Bulk densities were determined using the Archimedes (water displacement) method. Skeletal densities were determined using an automated Quantachrome Corp. Pentapycnometer Helium Pycnometer. Open porosity was determined by water intrusion techniques. X-ray diffraction was performed on powdered specimens mounted in trays. Samples were run 4°–80° $2\theta$ at 2° $2\theta$/min. using Ni-filtered $CuK_{alpha}$ radiation. Data was plotted at constant scales to allow comparison. The results are shown in Table 3.

TABLE 3

| | PROPERTIES OF CYCLED AND UNCYCLED COMPOSITIONS | | | | | | | | |
|---|---|---|---|---|---|---|---|---|---|
| | As Prepared | | | | | After 300 Cycles | | | |
| Comp. No. | Rho Bulk | Rho Skeletal | Open Porosity % | Alpha 24–1000° C. | Rho Bulk g/cc | Rho Skeletal g/cc | Open Porosity % | Coefficient of Thermal Expansion 24–1000° C. | Dimensional Changes % |
| 1 | 2.59 | 3.70 | 30.7 | 0.1 | 2.49 | 3.75 | 31.2 | 0.3 | LT + 0.1 |
| 2 | 3.03 | 3.53 | 21.4 | 0.9 | 2.90 | 3.84 | 25.7 | 0.9 | LT + 0.1 |
| 3 | 3.67 | 3.92 | 3.7 | — | 3.62 | 4.16 | 5.1 | — | + 0.2 |
| 4 | 3.49 | 4.00 | 10.9 | — | 3.59 | 3.89 | 11.1 | — | LT + 0.2 |
| 5 | 3.57 | 3.95 | 7.0 | — | 3.60 | 3.95 | 7.9 | — | + 0.3 | where LT = less than

The region between 30°–45° $2\theta$ was printed at a constant vertical scale to determine whether any changes occurred in peak heights or decomposition products. The standard data utilized were those evaluated and published by the ASTM Joint Committee on Powder Diffraction Standards (JCPDS). These data are routinely used as standard X-ray diffraction references in all phases of academic, commercial and private research, and are generally regarded to be very reliable. The peaks used for reference were as follows:

| Component | (hkl) | I/Io | JCPDS # |
|---|---|---|---|
| $Al_2O_3$ (corundum) | 113 | 100 | 10–173 |
| $ZrTiO_4$ | 111 | 100 | 7–290 |
| monoclinic $ZrO_2$ | 111 | 65 | 13–307 |
| $TiO_2$ (rutile) | 101 | 50 | 21–1276 |
| $Al_2TiO_5$ | 023 | 64 | 26–40 |

The test for decomposition was to compare the X-ray diffraction patterns of as-sintered samples and samples

TABLE 2

| | COMPOSITIONS OF CYCLED SAMPLES | | | | |
|---|---|---|---|---|---|
| | $Al_2TiO_5$ Composition | | | | |
| Comp. No. | Alcoa A 16SG alpha-$Al_2O_3$ (0.5 micron)* g. | Dupont TiPure $TiO_2$ (2–3 micron) g. | Davison Syloid $SiO_2$ (1 micron) g. | Dynazirkon $ZrO_2$ (0.7 micron) g. | Pre-reacted Zirconium Titanate ($ZrTiO_4$ Pre-fired Stoichiometry) |
| 1 | 8.3899 | 6.2511 | 0.1232 | 0.2549 | 1.0064 |
| 2 | 7.0888 | 5.3861 | 0.1251 | — | 7.4970 |
| 3 | 5.0507 | 3.9005 | 0.0747 | — | 3.7676 |
| 4 | 5.0504 | 3.9008 | — | 0.1500 | 3.6891 |
| 5 | 5.0496 | 3.5997 | 0.1506 | 0.3101 | 3.6722 |

*Values in ( )'s indicate average particle size of starting powder cycled 300 times. The absence of increased $Al_2O_3$ or $TiO_2$ peak intensities after 300 cycles, as well as no significant changes in $Al_2TiO_5$ peak intensities, indicated a lack of decomposition due to cycling. The introduction of Al₂O₃ contaminents due to milling in an Al₂O₃ jar were thus taken into account, since neither the Al₂O₃ or Al₂TiO₅ peak intensities would change after cycling if no decomposition occurred.

Compositions 1–5 in Table 2 showed no changes in Al₂TiO₅ or Al₂O₃ (traces in uncycled Sample No. 1) peak intensities after 300 cycles. In addition, no rutile or other titanium dioxides were noted in any X-ray results, indicating there was no Al₂TiO₅ phase decomposition. Furthermore, no significant differences in peak heights were observed with ZrO₂ or ZrTiO₄ as a result of cycling. Small differences in densities and porosities may be attributed to experimental error since samples used for cycling were small (0.5–2.0 cm³).

The lack of physical growth with cycling is an important factor since monolithic catalyst supports must have minimal growth to prevent this bursting of their metal containers in the exhaust system. A goal of 1.5% is difficult to achieve with microcracking ceramics such as mullite-aluminum titanate in the described cycling environment. However, compositions in this example in bar form did not exceed 0.5% growth.

EXAMPLE 2

This example shows the presence of minor additives do not effect the overall properties of the final composite ceramic.

A batch of iron stabilized Al₂TiO₅ was made by mixing 2.3208 g. Alcoa A16SG Al₂O₃, 1.9997 g. Baker Reagent TiO₂ (2 micron), and 0.1600 g. MCB reagent Fe₂O₃. The mixture was fired at 1450° C. for 1 hr. and then re-milled to a fine powder (3–5 micron). A batch of zirconium titanate was made by mixing 0.9501 g. Baker Reagent TiO₂ and 1.4239 g. TAM 98% ZrO₂ powders. The mixture was fired at 1450° C. for 1 hr. and then re-milled to a fine powder (3–5 micron). Then 4.2541 g. of prereacted Al₂TiO₅ powder and 2.3740 g. of the prereacted zirconium titanate were mixed together, pressed into a pellet and fired at 1550° C. for 2 hrs.

The thermal expansion curve was obtained as previously described. Its coefficient of thermal expansion, $\alpha_{24°-1000°\ C.}$, is $1.2 \times 10^{-6°}\ C.^{-1}$. The curve does not contain the drop in the curve between 400°–900° C., but nonetheless maintains a low thermal expansion value. The curve of this example, compared with that of Composition 2, Table 2, Example 1, are shown in FIG. 2.

EXAMPLE 3

This example shows that high ZrTiO₄ contents do not adversely affect the physical properties and thermal expansion.

A mixture of 5.0800 g. ZrTiO₄ and 6.1204 g. Al₂TiO₅ (with 2 mol % SiO₂ stabilizer) powders was milled in an Al₂O₃ jar in a Spex mill for 30 minutes. Average particle size was less than 3.5 microns. A portion of the powder was pressed into a pellet of 1⅛″ diameter using mineral oil as a binder. The pellet was then fired in the Lindbergh box furnace for 2 hours at 1550° C. in air. Properties are shown below:

| | |
|---|---|
| bulk density, g/cc: | 3.72 |
| skeletal density, g/cc: | 4.19 |
| Open Porosity, %: | 10.5 |
| $\alpha_{24-1000°\ C.} \times 10^{-6°}C.^{-1}$: | 0.72 |

The dilatometer curve showed an obvious downturn beginning at 440° C., and an upward inflection at 1150° C. X-ray diffraction showed the major phases were aluminum titanate and zirconium titanate, along with a minor phase of monoclinic zirconia. No other phases were observed within the limits of X-ray diffraction.

The microstructure consisted of a predominant aluminum titanate phase consisting of irregular to elongate grains. The majority ranged between 3–10 microns. Abundant, irregular zirconium titanate and zirconia grains were dispersed throughout the microstructure, and ranged from 2–18 microns. Microcracks were observed.

EXAMPLE 4

This example describes producing ceramic tubes with the composition according to this invention.

An Al₂TiO₅ solid solution composition consisting of 15.1500 g. Alcoa A16SG alpha-Al₂O₃, 11.5497 g. Dupont TiPure, TiO₂, 0.2708 g. Davison SYLOID SiO₂ and 0.5098 g. Dynamit-Nobel ZrO₂ powders were milled in a Spex Mill into an intimate mixture with a fine (1.5 micron) particle size. To this mixture was added 6.5999 g pre-reacted stoichiometric ZrTiO₄ powder. The mixture was wet ball-milled for 30 minutes, filtered and dried. An extrusion formula was made, as follows:

16.89 g. Powder Mixture
0.20 g. Polyethylene FD 60018 Polymer
0.60 g. Gulf Mineral Oil
0.20 g. Zinc Stearate (J. T. Baker Co.)

A laboratory scale warm extruder was made by modifying a melt-indexer and filling it with a die for forming a tube. The formulation above was fed through the extruder at 150° C. at least four times, after which an extrusion run was made. The extrudate was fed into a container of water to quench it. Ceramic tubes of excellent consistency were extruded and baked out at 105° C. for 10 hours. Weight losses of 14–23.5% were recorded for the series of extruded tubes. Samples sintered at 1450° C. for 2 hours had a bulk density of 3.07 g/cc, a skeletal density of 3.86 g/cc, and 23% open porosity (by water intrusion method). The thermal expansion, $\alpha_{24°-1000°}\ C.$ was $0.6 \times 10^{-6°}\ C.^{-1}$. X-ray diffraction showed the primary phase to be Al₂TiO₅ with approximately equal volumes of the minor phases ZrTiO₄ and monoclinic ZrO₂. The interior microstructures of these tubes were very porous, and the majority of grain sizes were between 3–8 microns. The exteriors of the tubes had very rounded, intergrown grains whose boundaries were difficult to distinguish.

EXAMPLE 5

This example compares the product made by the present invention with a prior art composition.

L. M. Silich et al describe various ceramic compositions made of ZrO₂ and aluminum titanate in an article "Effect of ZrO₂ on the Formation of Aluminum Titanate" in Steklo, Sitally i Silikaty, Volume 13, pages 110–14 (1984). We duplicated one of their compositions containing 15 wt % ZrO₂ in Al₂TiO₅ as follows.

The article of Silich et al did not give a fully detailed recipe of their synthesis. However, adequate information was given so that one skilled in the art could confidently synthesize samples which gave properties very close to those reported. Thus, while heating rates weren't given, sintering conditions were described. Furthermore, while exact powders and particle sizes weren't given, the use of oxides was noted. This is explainable by the fact that the study was designed to determine the effects of $ZrO_2$ on $Al_2TiO_5$ and was not an attempt to stabilize a new ceramic material and document the properties.

In an attempt to replicate the method of Silich et al, dry powders consisting of 5.1003 g. Alcoa A16SG $Al_2O_3$, 3.2000 g. Baker Reagent Grade $TiO_2$ (Rutile), and 1.2307 g. Zircar unstabilized (monoclinic) $ZrO_2$ were weighed out. The powders were mixed for 0.5 hr. in an $Al_2O_3$ jar in a Spex Mill, pressed into discs on a Carver Press, and sintered 2 hrs/1500° C. in air. The product had a bulk density of 3.17 g/cc, 17% open porosity and a thermal expansion $alpha_{24°-1000°}$ C.$= -0.7 \times 10^{-6°}$ C.$^{-1}$. X-ray diffraction showed $Al_2TiO_5$ was the major phase, along with minor $ZrO_2$ and $ZrTiO_4$, as well as a trace of $Al_2O_3$.

The sample described was heated to 1200° C. for 4 hours, simulating the decomposition test of Silich, et al. A sample of the claimed $Al_2TiO_5$-$ZrTiO_4$ with an equivalent of 18 wt % $ZrO_2$ (sample #3-Table 2, Example 1) was also tested for comparison. Portions of each sample were removed at 2 hours to monitor decomposition progress.

X-ray diffraction results show the $Al_2TiO_5$ in the replicated sample of Silich et al underwent severe decomposition to $Al_2O_3$ and $TiO_2$ at 2 hours. $Al_2TiO_5$ almost totally disappeared by 4 hours at 1200° C., with corresponding increases in the $Al_2O_3$ and $TiO_2$ peaks, as described by Silich et al. The $ZrTiO_4$ phase apparently also underwent decomposition, but the $ZrO_2$ did not appear affected. By contrast, the sample described in Example 1 shows no appreciable changes in the intensities of the $Al_2TiO_5$ or $ZrTiO_4$ peaks, and no progressive increase in $Al_2O_3$ or $TiO_2$, indicating lack of decomposition.

To further illustrate the deleterious effects of decomposition on thermal shock, a bar made from the same replicated Silich et al's method and exposed at 1200° C./4 hrs. was run on the dilatometer to determine thermal expansion as described in a previous section. The expansion prior to the 1200° C. exposure was $alpha_{24°-1000°}$ C.$= -0.7 \times 10^{-6°}$ C.$^{-1}$. However, after exposure, the expansion increased to $alpha_{24°-1000°}$ C.$= -8.4 \times 10^{-6°}$ C.$^{-1}$. This value is reasonable given the high expansions of the $Al_2O_3$ and $TiO_2$ decomposition products (8.8 and $7.5 \times 10^{-6°}$ C.$^{-1}$, respectively).

This example illustrates the superior high temperature phase stability and corresponding long-term low thermal expansion behavior of the $Al_2TiO_5$-zirconium titanate-zirconia materials claimed herein. Their excellent performance relative to similar materials described in the literature underscores the uniqueness of their final properties and preparation.

EXAMPLE 6

Electron microprobe analyses were performed on a range of aluminum titanate-zirconium titanate-zirconia composites and a sample reproducing the work of Silich, et al. Standardized wavelength dispersive analyses were done using a Cameca Camebax Automated Three Spectrometer Microprobe. Beam conditions were 25 nanoamps/20 KV. Analyses were obtained from a one micron volume, and count time was 10 seconds per point. Standards used were:

Zircon (NBS standard) for Zr, Si (Zr=45.02 wt %, Si=17.67 wt %)

Aluminum Titanate (synthetic) for Al, Ti (Al=29.20 wt %, Ti=25.36 wt %)

Accuracy was ±1% for Al, Ti and ±3% for Zr, Si. All analyses were corrected by ZAF and other standard software programs. Mass balances varied between samples as a function of aging of the tungsten filament.

The four samples analyzed were as follows:

A. starting composition of 15 vol % $ZrTiO_4$-balance $Al_2TiO_5$ (with 2 mol % $SiO_2$ stabilizer):synthesis/sintering similar to Composition 2 - Table 1.

B. starting composition of 25 vol % $ZrTiO_4$-balance $Al_2TiO_5$ (with 2 mol % $SiO_2$ stabilizer):hot pressed and annealed at 1500° C.

C. starting composition of 50 vol % $ZrTiO_4$-balance $Al_2TiO_5$ (with 2 mol % $SiO_2$ stabilizer): synthesis/sintering similar to Composition 4, Table 1

D. $Al_2TiO_5$-$ZrO_2$ composition following the work of Silich, et al, as described in Example 5.

Typical point analyses are shown in Table 4.

TABLE 4

MICROPROBE ANALYSES

| | Aluminum Titanate | | | | | | | | | | Zirconia | | | | | | | | |
|---|---|---|---|---|---|---|---|---|---|---|---|---|---|---|---|---|---|---|---|
| | AT-1 | AT-2 | AT-3 | AT-4 | AT-5 | AT-6 | AT-7 | AT-8 | AT-9 | AT-10 | ZR-1 | ZR-2 | ZR-3 | ZR-4 | ZR-5 | ZR-6 | ZR-7 | ZR-8 | ZR-9 |
| (A) 15 vol % $ZrTiO_4$ - $Al_2TiO_5$ (sintered) | | | | | | | | | | | | | | | | | | | |
| $Al_2O_3$ | 55.7 | 57.4 | 62.0 | 55.8 | 55.1 | | | | | | 2.3 | 0.6 | 0.3 | 0.9 | 0.3 | 4.0 | 1.1 | 0.4 | |
| $TiO_2$ | 41.7 | 35.8 | 40.0 | 41.6 | 42.1 | | | | | | 12.4 | 8.5 | 11.5 | 9.7 | 1.2 | 12.0 | 9.8 | 9.1 | |
| $ZrO_2$ | 1.6 | 2.2 | 1.6 | 2.0 | 1.8 | | | | | | 81.9 | 82.8 | 83.3 | 84.1 | 91.8 | 81.2 | 79.2 | 85.5 | |
| $SiO_2$ | 0.5 | 0.5 | 0.8 | 1.0 | 1.4 | | | | | | 0.2 | 0.1 | 0.1 | 0.3 | 0.1 | 0.1 | 0.2 | 0.3 | |
| (B) 25 vol % $ZrTiO_4$ - $Al_2TiO_5$ (hot pressed) | | | | | | | | | | | | | | | | | | | |
| $Al_2O_3$ | 49.0 | 51.0 | 51.2 | 48.7 | 51.8 | 51.3 | 52.5 | 53.6 | | | 0.4 | 0.5 | 0.4 | 0.6 | 0.3 | 0.5 | 0.4 | 0.2 | 0.5 |
| $TiO_2$ | 38.2 | 39.0 | 37.5 | 37.9 | 37.5 | 37.5 | 37.8 | 38.0 | | | 10.7 | 10.2 | 10.5 | 10.6 | 10.1 | 10.4 | 10.1 | 10.6 | 12.5 |
| $ZrO_2$ | 2.1 | 2.1 | 2.0 | 2.0 | 2.0 | 2.2 | 2.1 | 1.9 | | | 83.4 | 75.7 | 78.2 | 82.9 | 77.8 | 81.5 | 79.8 | 82.3 | 82.0 |
| $SiO_2$ | 0.5 | 0.3 | 0.4 | 0.3 | 0.3 | 0.3 | 0.4 | 0.3 | | | 0.1 | 0.1 | 0.1 | 0.1 | 0.1 | 0.1 | 0.1 | 0.1 | 0.0 |
| (C) 50 vol % $ZrTiO_4$ $Al_2TiO_5$ (sintered) | | | | | | | | | | | | | | | | | | | |
| $Al_2O_3$ | 55.3 | 57.4 | 55.5 | 55.4 | 53.7 | 59.3 | 57.6 | 54.7 | 53.2 | 57.2 | 4.4 | 4.7 | 6.6 | 0.6 | | | | | |
| $TiO_2$ | 44.4 | 43.9 | 43.9 | 44.7 | 44.3 | 44.8 | 43.3 | 40.3 | 39.0 | 44.0 | 15.9 | 17.0 | 17.1 | 14.7 | | | | | |
| $ZrO_2$ | 1.6 | 1.7 | 1.5 | 1.5 | 1.6 | 1.4 | 1.3 | 1.5 | 1.4 | 1.3 | 71.0 | 72.8 | 68.1 | 77.3 | | | | | |
| $SiO_2$ | 0.5 | 0.5 | 0.5 | 0.5 | 0.5 | 0.5 | 0.6 | 0.4 | 0.6 | 0.5 | 0.2 | 0.2 | 0.4 | 0.7 | | | | | |
| (D) After Silich, et al - 15 vol % $ZrO_2$/$Al_2TiO_5$ | | | | | | | | | | | | | | | | | | | |
| $Al_2O_3$ | 49.9 | 51.9 | 50.5 | 45.4 | 53.1 | 54.8 | 52.0 | 64.3 | 51.0 | 51.1 | 4.9 | 5.5 | 2.1 | 0.5 | 0.3 | 0.4 | 0.3 | 0.3 | 0.0 |
| $TiO_2$ | 39.5 | 34.3 | 39.2 | 32.9 | 37.3 | 34.7 | 37.2 | 24.8 | 39.1 | 39.1 | 13.5 | 13.9 | 9.7 | 9.9 | 9.4 | 10.1 | 9.5 | 9.2 | 8.4 |
| $ZrO_2$ | 4.3 | 11.6 | 2.6 | 23.1 | 2.7 | 3.1 | 2.6 | 2.8 | 2.4 | 3.1 | 83.5 | 78.0 | 73.7 | 84.3 | 92.2 | 87.9 | 86.3 | 80.0 | 84.0 |
| $SiO_2$ | 0.2 | 0.1 | 0.2 | 0.2 | 0.2 | 0.2 | 0.2 | 0.2 | 0.2 | 0.1 | 0.1 | 0.1 | 0.1 | 0.0 | 0.0 | 0.0 | 0.1 | 0.0 | 0.0 |

For the three aluminum titanate-zirconium titanate-zirconia composites, there is a striking homogeneity of the minor components $ZrO_2$ and $SiO_2$ within the aluminum titanate phase. Within a sample, and within the range of compositions claimed, analysis show $ZrO_2$ stayed within a narrow range of about 1.5–2.0 wt %, while the $SiO_2$ range was about 0.3–1.0 wt %. $Al_2O_3$ and $TiO_2$ analyses were also comparable within the accuracies of the technique.

The phase analyses of the $Al_2TiO_5$-$ZrO_2$ composition replicating Silich et al did not show the homegeneity within the $Al_2TiO_5$ described above. $ZrO_2$ varied widely from 2.6 to 23.1 wt % with significant fluctuations also noted within the $Al_2O_3$ and $TiO_2$ values. The $SiO_2$ analyses were constant, but the only $SiO_2$ present was from the $ZrO_2$ starting materials and processing so this was expected.

Comparison of microstructures shows the composition replicating the Soviet work of Silich et al, has irregular, intergrown $Al_2TiO_5$ grains. The grains show less definition and are somewhat smaller than those of the claimed composites (approx. 5–7 microns versus 7–10 microns, respectively. Zirconia-bearing phases tended to be smaller (1–3 microns) and more rounded than their counterparts in the claimed compositions where the more angular grains averaged 5–10 microns, depending upon the processing.

A comparison of the claimed aluminum titanate-zirconium titanate-zirconia composites to those compositions of Silich, et al show significant differences on a microscopic scale. The chemical homogeneity of the critical aluminum titanate phase within the range of claimed compositions is, along with the resultant microstructure, a product of ceramic processing of the proper starting materials in the proper preferred $Al_2TiO_5$:$ZrTiO_4$ proportions. The different microchemical properties, microstructures and clearly inferior stability/high temperature properties achieved by simply mixing $Al_2TiO_5$ and $ZrO_2$ attest to the unobvious nature of the claimed compositions.

EXAMPLE 7

This example characterizes and illustrates the superior, high tempeature properties of two 25 vol % $ZrTiO_4$-$Al_2TiO_5$ starting compositions in which $Fe_2O_3$ additives to the $Al_2TiO_5$ were used. The two compositions, whose constituents are listed below, were identical except for the amount of $Fe_2O_3$ present in the $Al_2TiO_5$.

| Composition | A16SG $Al_2O_3$ | MCB Reagent $Fe_2O_3$ | Baker Reagent $TiO_2$ |
|---|---|---|---|
| A | 4.9453 g. | 0.2403 g. | 4.0000 g. |
| B | 15.5404 g. | 1.0700 g. | 13.3903 g. |

In each case, powders were milled for 0.5 hours in a Spex Mill prior to firing the powders at 1450° C. for 2 hours in air. The resultant pre-reacted powders were Spex Milled for 1½ hours to fine particle sizes (composition A was 2.7 micron and B was 4.5 micron).

Portions of each powder weighing 4.500 g were then mixed with 2.000 g portions of stoichiometric $ZrTiO_4$ powder. Each mixture was then Spex Milled for ½ hour, and the resultant powders pressed into 1¼ diameter pellets at 10,000 psi in a Carver Press. Sintering was done at 1500° C. in air for 2 hours, using heating/cooling rates of 12.3°/minute. The two compositions were then cycled using the test protocol described in Ex. 1, except the hold temperature was 1150° C. rather than 1000° C. Fresh and cycled samples were characterized for thermal expansion and phase stability, with the results as follows:

| Composition | Fresh $\alpha 24$–1000° C. | Cycled $\alpha 24$–1000° C. | XRD Differences Between Fresh and Cycled |
|---|---|---|---|
| A | 1.2 | 1.5 | Slight traces of $Al_2O_3$ & $TiO_2$ |
| B | 0.6 | 1.5 | No traces of $Al_2O_3$ & $TiO_2$ |

Sample B was also subjected to a 50 hour isothermal heat-soak at 1150° C. to determine whether long-term exposures would accelerate decomposition. After the test, the XRD pattern was free of $\alpha Al_2O_3$ and $TiO_2$ decomposition products, and there were no XRD differences from the starting material. The thermal expansion changed from 0.6 to $1.2 \times 10^{-6}$ C.$^{-1}$ after the 50 hour/1150° C. soak.

Electron microprobe analyses were performed on the two samples to confirm the presence of solid solutions in the $Al_2TiO_5$ phase. All microprobe conditions and standards were identical to those described in Example 6, except an additional standard for iron in the form of andradite garnet (Ca=23.8, Fe=21.9, Si=16.4 wt %) was used. As shown in Table 5, the $Fe_2O_3$ goes into solid solution as expected with concentrations being very consistent between grains in each sample. There are also traces of $ZrO_2$ present.

TABLE 5

MICROPROBE ANALYSES OF $Al_2TiO_5$ COMPOSITIONS WITH IRON ADDITIVES

| | Aluminum Titanate | | | | | | | | | |
|---|---|---|---|---|---|---|---|---|---|---|
| | AT-1 | AT-2 | AT-3 | AT-4 | AT-5 | AT-6 | AT-7 | AT-8 | AT-9 | AT-10 |
| Composition A | | | | | | | | | | |
| $Al_2O_3$ | 51.3 | 51.4 | 54.0 | 56.6 | 53.8 | 53.8 | 52.7 | 53.8 | 52.6 | — |
| $TiO_2$ | 44.2 | 42.9 | 43.1 | 42.0 | 43.1 | 43.0 | 42.1 | 44.2 | 42.3 | — |
| $ZrO_2$ | 0.4 | 0.1 | 0.2 | 0.2 | 0.4 | 0.1 | 0 | 0 | 0.1 | — |
| $Fe_2O_3$ | 3.2 | 3.4 | 3.5 | 3.5 | 3.1 | 3.6 | 3.4 | 3.5 | 3.6 | — |
| Composition B | | | | | | | | | | |
| $Al_2O_3$ | 56.4 | 50.5 | 57.8 | 55.3 | 49.3 | 51.5 | 51.6 | 58.4 | 49.5 | 54.0 |
| $TiO_2$ | 41.6 | 42.5 | 42.7 | 41.7 | 43.0 | 41.1 | 44.3 | 40.5 | 43.5 | 40.3 |
| $ZrO_2$ | 0.1 | 0.8 | 0.1 | 0.2 | 0.2 | 1.9 | 0.0 | 0.0 | 0.7 | 1.1 |
| $Fe_2O_3$ | 5.5 | 5.0 | 5.6 | 4.8 | 5.2 | 4.3 | 5.6 | 4.2 | 4.8 | 4.2 |

EXAMPLE 8

This example shows the effects of adding excess zirconia to a prereacted mixture of zirconium titanate-aluminum titanate.

5.4996 g. of a fire powder (5 micron particle size) consisting of pre-reacted 25 volume % zirconium titanate—75 volume % aluminum titanate (2 mole % silica stabilizer) was mixed with 0.5007 g. Dynamit-Nobel $ZrO_2$ (partially stabilized with 5 mole % $Y_2O_3$; 0.5 micron particle size) in a Spex Mill for 30 minutes. The resultant mixture was pressed at 10,000 psi in a Carver Press and the pellet fired to 1550° C. at 8.6°/minute, kept at 1550° C. for 2 hours, and then cooled to ambient in 2 hours. X-ray diffraction showed the product contained primarily $Al_2TiO_5$, along with lesser amounts of zirconium titanate, and both monoclinic and tetragonal $ZrO_2$. Skeletal density by helium pycnometry was 4.16 g/cc. Coefficient of thermal expansion as determined using the method shown in FIG. 1, was $-0.3 \times 10^{-6°}$ C.$^{-1}$. Therefore, the addition of excess partially-stabilized $ZrO_2$ has no detrimental effects on the final ceramic body which gives a similar phase assemblage by X-ray diffraction and low thermal expansion as those where no excess $ZrO_2$ is added. It is acknowledged that such additions may influence strength or toughness properties. The presence of excess unstabilized zirconia would result in similar properties and would therefore, not depart from the scope of this invention.

EXAMPLE 9

This example discloses the extrudability of a zirconium titanate-aluminum titanate powder into a honeycomb shape.

A charge was made consisting of 200 g. Dow Chemical Co. methylcellulose and 4800 g. of fine (5 micron particle size) ceramic powder. The ceramic powder was made using the technique and proportionately scaled-up constituents described as composition 2, Table 2, Example 1. The powder consisted of 25 volume % zirconium titante—75 volume % aluminum titanate (silica stabilized). Batches of 627 g. powder were then each mixed with 120 g. distilled water in a sigma blade mixer until the batch had an even, tacky consistency. Batches were combined and charged into a Loomis 40 ton press with a 2⅝ inch diameter ram extruder. The charge was forced through a die consisting of ¼" holes ("spaghetti die") several times to produce strands. These strands were then re-charged into the extruder and forced through a honeycomb die at 1-3 tons pressure. The honeycomb extrudate was rapidly removed to a microwave oven where it was dried for 15-20 minutes. The dried extrudate was then fired as follows: to 400° C. at 3°/min., held 2 hrs. at 400° C., heated to 1500° C. at 4.6°/min., held at 1500° C. for 1 hour, and cooled to ambient in 2 hours. The product was a monolithic ceramic with a honeycomb cross-section containing approximately 484 square cells/square inch. X-ray diffraction showed the product to be aluminum titanate, zirconium titante and zirconia.

Microstructures showed irregular to elongated $Al_2TiO_5$ grains, the majority of which ranged between 3-10 microns. There was some evidence of grain orientation in the extrusion direction. Zirconium titanate and zirconia grains were angular to rounded, and the majority ranged between 1-5 microns. The zirconia phases were distributed throughout the microstructure as discreet grains or agglomerates.

It is understood that the foregoing detailed description is given merely by way of illustration and that many variations may be made therein without departing from the spirit of this invention.

What is claimed is:

1. A ceramic composition comprising a predominant $Al_2TiO_5$ phase along with zirconium titanate and zirconia phases where the final overall ceramic composition has a low thermal expansion between 24°-1000° C. of not greater than $1.5 \times 10^{-6°}$ C.$^{-1}$ and a thermal stability in air such that (a) upon heating at 1200° C. for at least 4 hours there is substantially no decomposition of the $Al_2TiO_5$ phase to rutile or alumina as measured by X-ray diffraction, (b) physical growth after thermal cycling between 200° and 1150° C. for 300 cycles does not exceed 1.5%, and (c) the composition maintains a low average thermal expansion between 24°-1000° C. of not greater than $1.5 \times 10^{-6°}$ C.$^{-1}$ after the isothermal heating at 1200° C. for at least 4 hours or cycling conditions.

2. A ceramic composition according to claim 1, further comprising in solid solution with at least the zirconium titanate or the $Al_2TiO_5$ an oxide selected from the group consisting of $ZrO_2$, $TiO_2$, $SiO_2$, $Fe_2O_3$ and mixtures thereof.

3. A ceramic composition according to claim 2, wherein the $Al_2TiO_5$ phase contains a phase decomposition stabilizer selected from the group consisting of $SiO_2$, $ZrO_2$, $Fe_2O_3$ or mixtures thereof.

4. A ceramic composition according to claim 3, wherein the phase decomposition stabilizer oxide is present in an amount of from 1 to 5 mole % of the total $Al_2TiO_5$ composition.

5. A ceramic composition according to claim 1, wherein the composition is made by firing at a temperature of 1250° C. or higher a starting mixture of a source of $ZrO_2$, a source of $TiO_2$, and a source of $Al_2O_3$.

6. A ceramic composition according to claim 5, wherein the starting mixture prior to firing comprises at least the equivalent of
   (a) 50-90 volume percent $Al_2TiO_5$ or a solid solution having a substantial amount of $Al_2TiO_5$ in the solid solution, and
   (b) 10-50 volume percent zirconium titanate.

7. A ceramic composition according to claim 6, wherein the zirconium titanate is in an amount from 10 to 50 volume percent, and has a composition within the range $ZrTi_{1+x}O_{4+2x}$, where $0 \leq x < 1$.

8. A ceramic composition according to claim 7, wherein the starting mixture further comprises a phase of free $ZrO_2$.

9. A ceramic composition according to claim 8, wherein the free $ZrO_2$ further comprises $TiO_2$ in solid solution.

10. Ceramic compositions according to claim 5, wherein the starting mixture before firing comprises at least one pre-reacted phase of $Al_2TiO_5$, zirconium titanate or their solid solutions containing minor amounts of compatible oxides, and the components necessary to form the remaining phases after firing.

11. A ceramic composition according to claim 5, wherein the starting mixture before firing comprises a mixture of (a) the compound $Al_2TiO_5$ or a solid solution of $Al_2TiO_5$ containing minor amounts of compatible oxides in solid solution and (b) prereacted zirconium titanate made from about equal molar amounts of $ZrO_2$ and $TiO_2$.

12. A ceramic composition according to claim 11 wherein the compatible oxide is selected from the group of $SiO_2$, $Fe_2O_3$ or mixtures thereof.

13. A method of making a low thermal expansion ceramic composition as defined in claim 1 comprising
 (1) forming a starting mixture of reactants prior to firing which stoichiometrically will have
  (a) 50-90 volume percent $Al_2TiO_5$ or a solid solution having a substantial amount of $Al_2TiO_5$ in the solid solution, and
  (b) 10-50 volume percent zirconium titanate; said mixture being either
   (i) prereacted $Al_2TiO_5$ and prreacted zirconium titanate,
   (ii) prereacted $Al_2TiO_5$ and sources of $TiO_2$ and $ZrO_2$ to form ziroconium titanate, or
   (iii) prereacted zirconium titanate and sources of $Al_2O_3$ and $TiO_2$ to form $Al_2TiO_5$; and
 (2) heating the mixture at a temperature of 1250° C. or higher.

14. A method according to claim 13, wherein the zirconium titanate is in an amount from 10 to 50 volume percent, and has a composition within the range $ZrTi_{1+x}O_{4+2x}$, where $0 \leq x < 1$.

15. A method according to claim 13, wherein the heating is done in the presence of air.

16. A method according to claim 14, wherein the starting mixture further comprises a phase of free $ZrO_2$.

17. A method according to claim 16, wherein the free $ZrO_2$ further comprises $TiO_2$ in solid solution.

18. A method of making low thermal expansion ceramic compositions according to claim 13, comprising combining at least one pre-reacted phase of $Al_2TiO_5$ and sources of $TiO_2$ and $ZrO_2$ to form zirconium titanate, and heating the mixture at a temperature of 1250° C. or higher.

19. A method of making low thermal expansion ceramic compositions according to claim 13, comprising combining at least one pre-reacted phase of zirconium titanate and sources of $Al_2O_3$ and $TiO_2$ to form $Al_2TiO_5$ and heating the mixture at a temperature of 1250° C. or higher.

20. A method of making low thermal expansion ceramic compositions according to claim 13, comprising combining $Al_2TiO_5$ and prereacted zirconium titanate made from about equal amounts of $ZrO_2$ and $TiO_2$ and heating the mixture at a temperature of 1250° C. or higher.

21. A method according to claim 20, further comprising adding to the starting mixture a compatible oxide selected from the group of $SiO_2$, $Fe_2O_3$ or mixtures thereof.

22. An extruded catalyst support made of the low thermal expansion ceramic composition according to claim 1 and having good thermal shock resistance.

23. An extruded catalyst support according to claim 22, wherein the support has a honeycomb cross section.

24. An extruded catalyst support made of the low thermal expansion ceramic composition according to claim 5 and having good thermal shock resistance.

25. An extruded catalyst support according to claim 24, wherein the support has a honeycomb cross section.

26. An extruded catalyst support made of the low thermal expansion ceramic composition according to claim 6 and having good thermal shock resistance.

27. An extruded catalyst support according to claim 26, wherein the support has a honeycomb cross section.

* * * * *